(12) United States Patent
Hirayama et al.

(10) Patent No.: US 8,418,416 B2
(45) Date of Patent: Apr. 16, 2013

(54) SOLAR CELL MODULE

(75) Inventors: Kitae Hirayama, Ise (JP); Ai Shibata, Higashihiroshima (JP)

(73) Assignee: Kyocera Corporation, Kyoto (JP)

( * ) Notice: Subject to any disclaimer, the term of this patent is extended or adjusted under 35 U.S.C. 154(b) by 117 days.

(21) Appl. No.: 12/934,608

(22) PCT Filed: Mar. 26, 2009

(86) PCT No.: PCT/JP2009/056196
§ 371 (c)(1),
(2), (4) Date: Dec. 14, 2010

(87) PCT Pub. No.: WO2009/119774
PCT Pub. Date: Oct. 1, 2009

(65) Prior Publication Data
US 2011/0083725 A1    Apr. 14, 2011

(30) Foreign Application Priority Data

Mar. 26, 2008  (JP) .................................. 2008-080630
Apr. 25, 2008  (JP) .................................. 2008-115718

(51) Int. Cl.
*E04D 13/18* (2006.01)
(52) U.S. Cl.
USPC ................ 52/173.3; 52/204.71; 136/251
(58) Field of Classification Search ............... 52/173.3, 52/204.71, 204.5; 136/251
See application file for complete search history.

(56) References Cited

U.S. PATENT DOCUMENTS

| | | | |
|---|---|---|---|
| 6,525,262 B1 | 2/2003 | Makita et al. | 136/244 |
| 6,826,885 B2 * | 12/2004 | Raskin et al. | 52/844 |
| 6,941,597 B2 * | 9/2005 | Hampe | 5/503.1 |
| D599,034 S * | 8/2009 | Placer | D25/60 |
| 2002/0121387 A1 | 9/2002 | Suzuki et al. | 174/50 |
| 2006/0243319 A1 * | 11/2006 | Kusek et al. | 136/246 |
| 2009/0165843 A1 * | 7/2009 | Horioka et al. | 136/251 |

FOREIGN PATENT DOCUMENTS

| | | |
|---|---|---|
| JP | 59138251 U | 9/1984 |
| JP | 03088362 U | 9/1991 |
| JP | 03-117854 | 12/1991 |
| JP | 10-294485 | 11/1998 |
| JP | 11-195803 | 7/1999 |
| JP | 2002-280770 | 9/2002 |
| JP | 2004-238860 | 8/2004 |
| JP | 2005347291 A | 12/2005 |
| JP | 2006-278537 | 10/2006 |
| JP | 2006-278538 | 10/2006 |

* cited by examiner

*Primary Examiner* — Jeanette E Chapman
*Assistant Examiner* — Daniel Kenny
(74) *Attorney, Agent, or Firm* — DLA Piper LLP (US)

(57) ABSTRACT

There are provided a solar cell panel and a frame mounted to an edge of the solar cell panel, wherein: the frame includes an elongated annular part provided along the edge of the solar cell panel and supporting the solar cell panel from a back surface side; the annular part includes an annular part having an annular shape in cross section orthogonal to a longitudinal direction thereof; the annular part includes a first part abutting against the solar cell panel in the cross section, and a pair of corners provided at both ends of the first part; and at least one of the pair of corners has an acute angle.

4 Claims, 9 Drawing Sheets

SOLAR CELL MODULE

CROSS-REFERENCE TO THE RELATED APPLICATION

This application is a national stage of international application No. PCT/JP2009/056196, filed on Mar. 26, 2010, and claims the benefit of priority under 35 USC 119 to Japanese Patent Application No. 2008-080630, filed on Mar. 26, 2008 and Japanese Patent Application No. 2008-115718, filed on Apr. 25, 2008, the entire contents of which are incorporated herein by reference.

TECHNICAL FIELD

The present invention relates to a solar cell module including a protective frame.

BACKGROUND ART

In recent years, solar cell modules that produce electric power by photoelectric conversion of sunlight have been widely used. The solar cell modules are required to have adequate strength for withstanding various environmental burdens (for example, snow load and wind pressure).

For example, Japanese Patent Application Laid-Open No. 10-294485 discloses the technology of reinforcing a solar cell module by mounting a protective frame on a periphery of a solar cell panel that is a main body portion of the solar cell module.

However, the solar cell module tends to have a solar cell panel of a larger size for improving power generation efficiency. This leads to a fear that rigidity may not be sufficiently ensured with a conventional protective frame.

DISCLOSURE OF INVENTION

An object of the present invention is to provide a solar cell module whose rigidity is improved.

A solar cell module according to one embodiment of the present invention includes a solar cell panel and a frame mounted to an edge of the solar cell panel, wherein: the frame includes an elongated support part provided along the edge of the solar cell panel and supporting the solar cell panel from a back surface side; the support part includes an annular part having an annular shape in cross section orthogonal to a longitudinal direction thereof; the annular part includes a first part abutting against the solar cell panel in the cross section, and a pair of corners provided at both ends of the first part; and at least one of the pair of corners has an acute angle.

When the solar cell module has the configuration described above, the part of the frame that supports the solar cell panel is resistant to deformation when a load is applied, and hence the strength of the frame can be improved.

BRIEF DESCRIPTION OF DRAWINGS

FIGS. 2A and 2B are views showing a solar cell module according to the first embodiment.

FIGS. 6A and 6B are cross-sectional views showing a state in which an external force is applied to the solar cell module.

BEST MODES FOR CARRYING OUT THE INVENTION

Photovoltaic systems including solar cell modules according to the embodiments of the present invention are described with reference to the drawings.

First Embodiment

Figure 1:
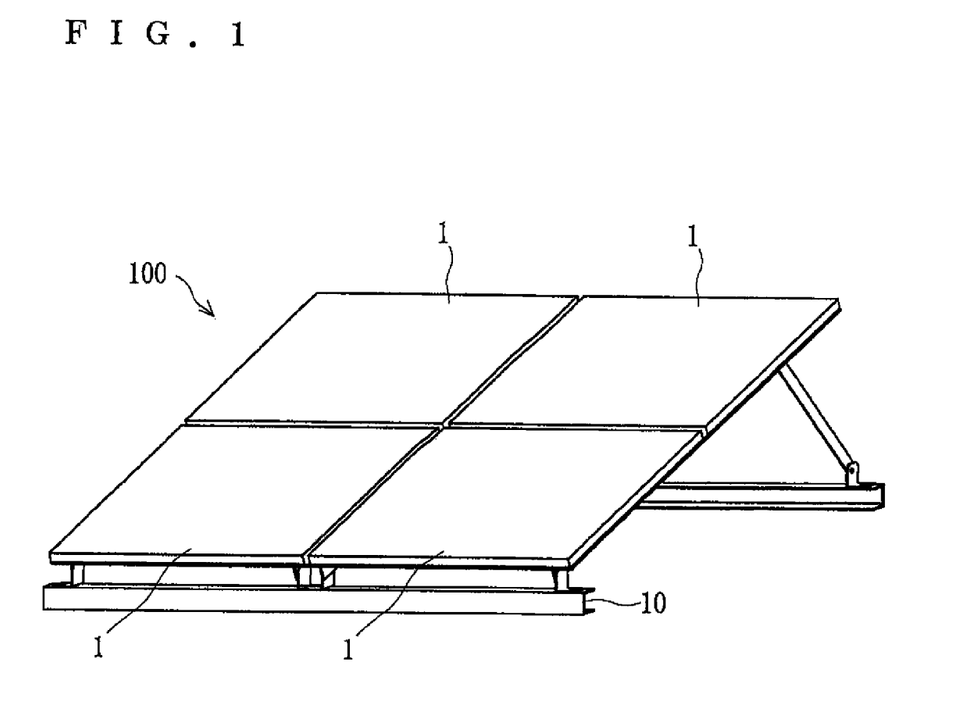
FIG. 1 is a perspective view showing a photovoltaic system according to a first embodiment of the present invention.

As shown in FIG. 1, a photovoltaic system 100 includes solar cell modules 1 and a platform 10 that holds the solar cell modules 1. The photovoltaic system 100 is installed in various places. For example, such installation places include a roof of a building and the ground in a site of a factory.

A periphery of the solar cell module 1 is mounted to the platform 10. The platform 10 is made of, for example, metal, light metal such as stainless steel, iron and aluminum, resin or wood.

Solar Cell Module

Figure 2A:
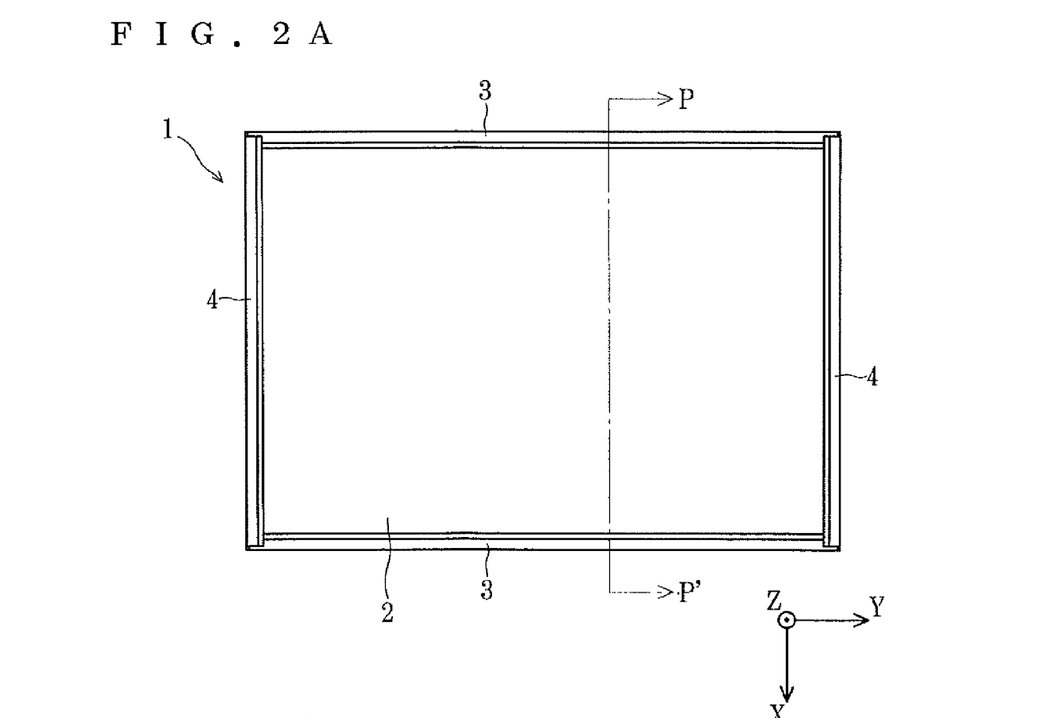
FIG. 2A is a plan view of the solar cell module on a light receiving surface side.

As shown in FIG. 2A, the solar cell module 1 includes a solar cell panel 2 having a rectangular flat plate shape, and a group of four frames (first frames 3 and second frames 4) mounted to the periphery of the solar cell panel 2. The first frames 3 are mounted to a pair of sides of the solar cell panel 2 that are opposed to each other, and the second frames 4 are mounted to the other pair of sides opposed to each other.

Figure 2B:
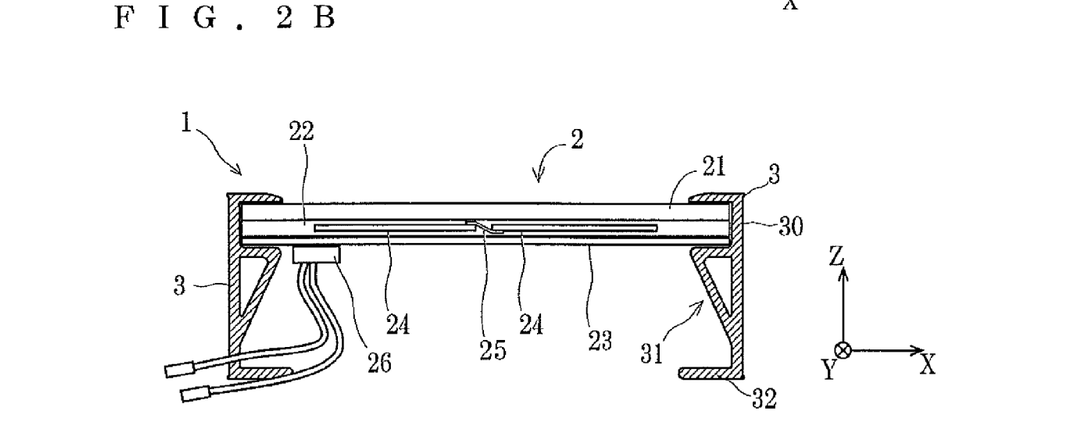
FIG. 2B is a cross-sectional view taken along a line P-P' of FIG. 2A.

Note that in FIGS. 2A and 2B and the following drawings, the longitudinal direction of the second frame 4 and the longitudinal direction of the first frame 3 in the solar cell module 1 are regarded as an X-axis direction and a Y-axis direction, respectively, and the direction perpendicular to an XY plane defined by those is defined as a Z-axis direction.

As shown in FIG. 2B, in the solar cell panel 2, a plurality of solar cell elements 24 coated with a filler 22 are disposed between a translucent substrate 21 provided on the light receiving surface side and a back surface protective material 23. Further, the solar cell elements 24 are electrically connected to each other through an inner lead 25. A terminal box 26 is mounted to the back surface protective member 23, and the electric power obtained through photoelectric conversion by the solar cell elements 24 is output toward the outside through the terminal box 26.

The translucent substrate 21 is a substrate having high light transmittance for causing light to enter the solar cell elements 24, and for example, glass substrates of white glass, tempered glass, double tempered glass, heat-reflective glass and the like, and synthetic resin substrates of a polycarbonate resin and the like are preferably employed. The translucent substrate 21 preferably has a thickness of approximately 3 mm to 5 mm in a case of a glass substrate, and approximately 5 mm in a case of a synthetic resin substrate.

The filler 22 is produced by forming, for example, a thermosetting resin or a resin having thermosetting property that is obtained by causing a thermoplastic resin to contain a crosslinking agent into a sheet shape with an extruding machine or the like, and then cutting it to a predetermined length.

The back surface protective member 23 has the function of protecting the filler 22. As the back surface protective member 23, for example, polyvinyl fluoride (PVF), polyethylene terephthalate (PET), polyethylene naphthalate (PEN), and one obtained by laminating those are preferably employed.

The solar cell element 24 can employ various types of elements. The solar cell elements 24 as described above include, for example, crystalline solar cell elements of single crystal silicon, polycrystalline silicon and the like, an amorphous silicon solar cell element, a Si thin film solar cell element, a CIS-based solar cell element, a CIGS-based solar cell and a dye-sensitized solar cell element.

In a case where the solar cell element 24 is manufactured of a single crystal silicon substrate or polycrystalline silicon substrate, a PN junction in which a p-layer containing a large amount of p-type impurities such as boron and an n-layer containing a large amount of n-type impurities such as phosphorus are joined is formed in the silicon substrate. Further, an electrode is formed on a front surface or back surface of the silicon substrate by, for example, screen-printing a silver paste. Note that soldering may be performed on a surface of the electrode for facilitating installation of the inner lead 25 or preventing degradation.

The inner lead 25 connects a solar cell element 24 and the other solar cell element 24 adjacent to this. As the inner lead 25, there is preferably used, for example, one obtained by performing solder plating for approximately 20 to 70 μm on a surface of a wiring material such as copper foil having a thickness of 0.1 mm to 0.5 mm by plating or dipping.

Frame

Figure 3:
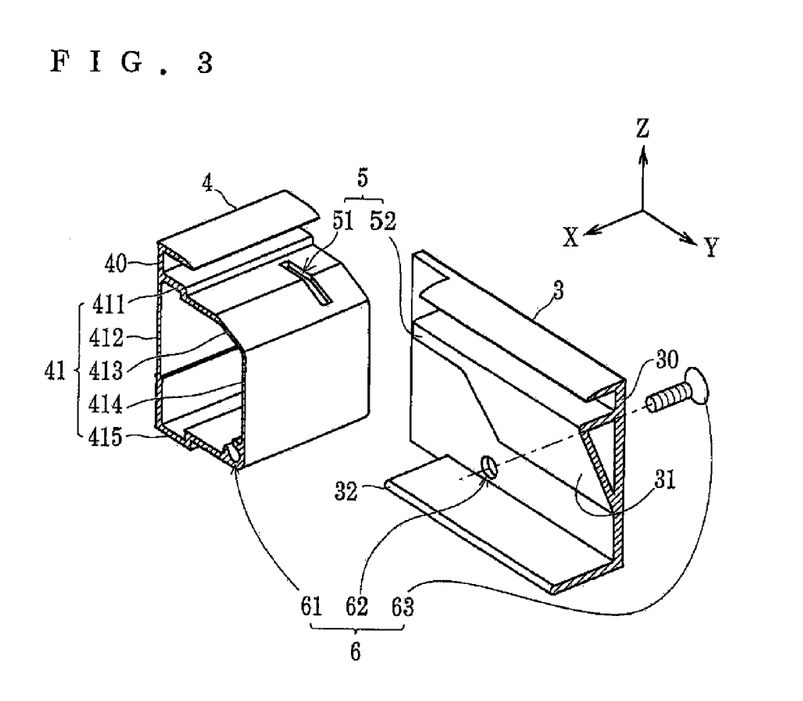
FIG. 3 is an enlarged perspective view showing part of a frame group in a disassembled state.

The first frame 3 and the second frame 4 shown in FIG. 3 are formed of aluminum, iron, stainless steel, resin or the like, and for example, are manufactured by extrusion molding. The first frame 3 includes a groove-like fitting part 30 into which the solar cell panel 2 is fitted and a support part for supporting the solar cell panel 2. The support part includes an annular part 31 having an annular shape in cross section perpendicular to the longitudinal direction thereof, and a bottom 32. The fitting part 30, the annular part 31 and the bottom 32 protrude toward the inside of the solar cell module 1 and extend along the side of an edge of the solar cell panel 2. The first frame 3 is described below in detail.

The second frame 4 includes a groove-like fitting part 40 into which the solar cell panel 2 is fitted and a support part 41 that supports the solar cell panel 2. The support part 41 includes a ceiling part 411, an outer part 412, a tilted part 413, an inner part 414 and a bottom part 415.

The ceiling part 411 has an area that abuts against the back surface of the solar cell panel 2 fitted into the fitting part 40. The outer part 412 is linked to the ceiling part 411 in a substantially perpendicular manner. The tilted part 413 is linked to the ceiling part 411 so as to form an obtuse angle. The inner part 414 is provided to so as to be linked to the tilted part 413 and be parallel to the outer part 412 in a substantially parallel manner. The bottom part 415 is linked to the outer part 412 and the inner part 414 in a substantially perpendicular manner.

Figure 4:
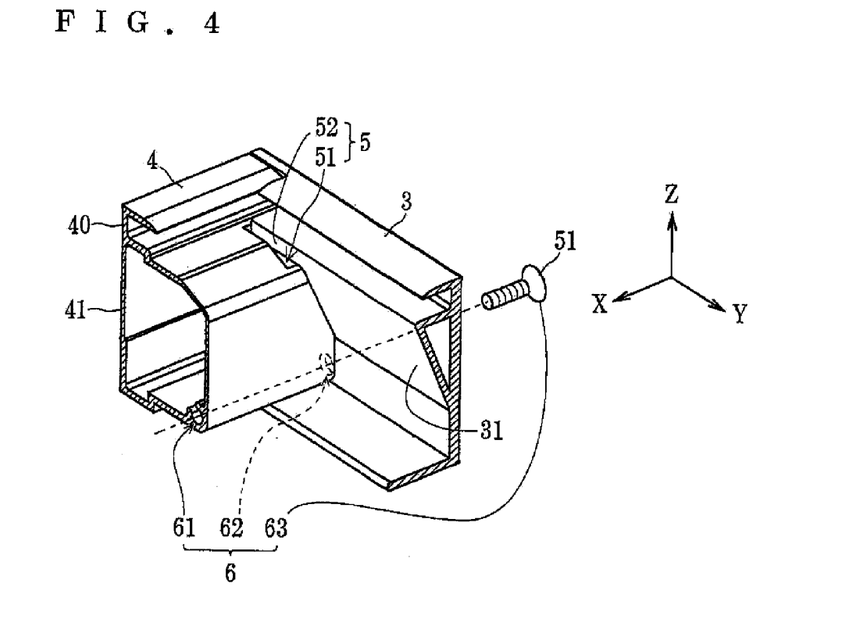
FIG. 4 is an enlarged perspective view showing the part of the frame group in a connected state.

As shown in FIG. 3, the second frame 4 is provided with an elongated slit 51 from the ceiling part 411 to the tilted part 413. In addition, a protrusion 52 having a shape corresponding to the slit 51 is formed to a terminated portion of the annular part 31 of the first frame 3. The slit 51 and the protrusion 52 form a fitting mechanism 5. As shown in FIG. 4, the protrusion 52 is fitted into the slit 51 by inserting the protrusion 52 into the slit 51. As a result, it is possible to suppress the first frame 3 from becoming misaligned toward the longitudinal direction (x-axis direction) of the second frame 4.

A screw hole 61 extending along the longitudinal direction of the second frame 4 is formed in the link portion of the inner part 414 and the bottom part 415. Further, an insertion hole 62 is provided to the first frame 3 so as to correspond to this. When the first frame 3 and the second frame 4 are connected by the fitting mechanism 5 as shown in FIG. 4, an opening position of the insertion hole 62 overlaps an opening position of the screw hole 61. Then, a screw 63 (fixture) is inserted into the insertion hole 62 to be screwed with the screw hole 61, whereby the first frame 3 is fastened to the second frame 4. The screw hole 61, the insertion hole 62 and the screw 63 constitute a fastening mechanism 6 that fastens the first frame 3 and the second frame 4.

The first frames 3 and the second frames 4 are connected at a plurality of different positions by a plurality of connecting mechanisms such as the fitting mechanisms 5 and the fastening mechanisms 6. Accordingly, in a case where a load is applied on the solar cell panel 2, a stress is dispersed in the vicinity of the protrusion 52 and the insertion hole 62 in the first frame 3, while a stress is dispersed in the vicinity of the slit 51 and the screw hole 61 in the second frame 4. As a result, the strength of the solar cell module 1 is improved, which makes it possible to reduce an occurrence of detachment of the solar cell panel 2.

In FIG. 3, the direction in which the protrusion 52 is inserted into the slit 51 and the direction in which the screw 63 is screwed are orthogonal to each other. In order to separate the first frame 3 and the second frame 4 from each other in this state, the protrusion 52 or the screw 63 needs to be sheared. However, an extremely large force is required to shear metal materials such as aluminum and stainless forming the protrusion 52 and the screw 63, which makes it difficult to separate the first frame 3 and the second frame 4 from each other.

Next, the configuration of the first frame 3 is described with reference to FIG. 5. The first frame 3 includes the fitting part 30 into which the solar cell panel 2 is fitted, the elongated annular part 31 that mainly supports the solar cell panel 2, and the bottom 32 positioned on an installation surface side (−Z side) of the solar cell module 1. The annular part 31 is formed of a first part 311, a second part 312 and a third part 313. The annular part 31 has a space 71 surrounded by the first part 311, the second part 312 and the third part 313 therein. The second part 312 is connected to one end of the first part 311 through a connecting part 34. The third part 313 is connected to the other end of the first part 311 through a connecting part 35. In addition, the second part 312 is connected to one end of the third part through a connecting part 36.

Figure 5:
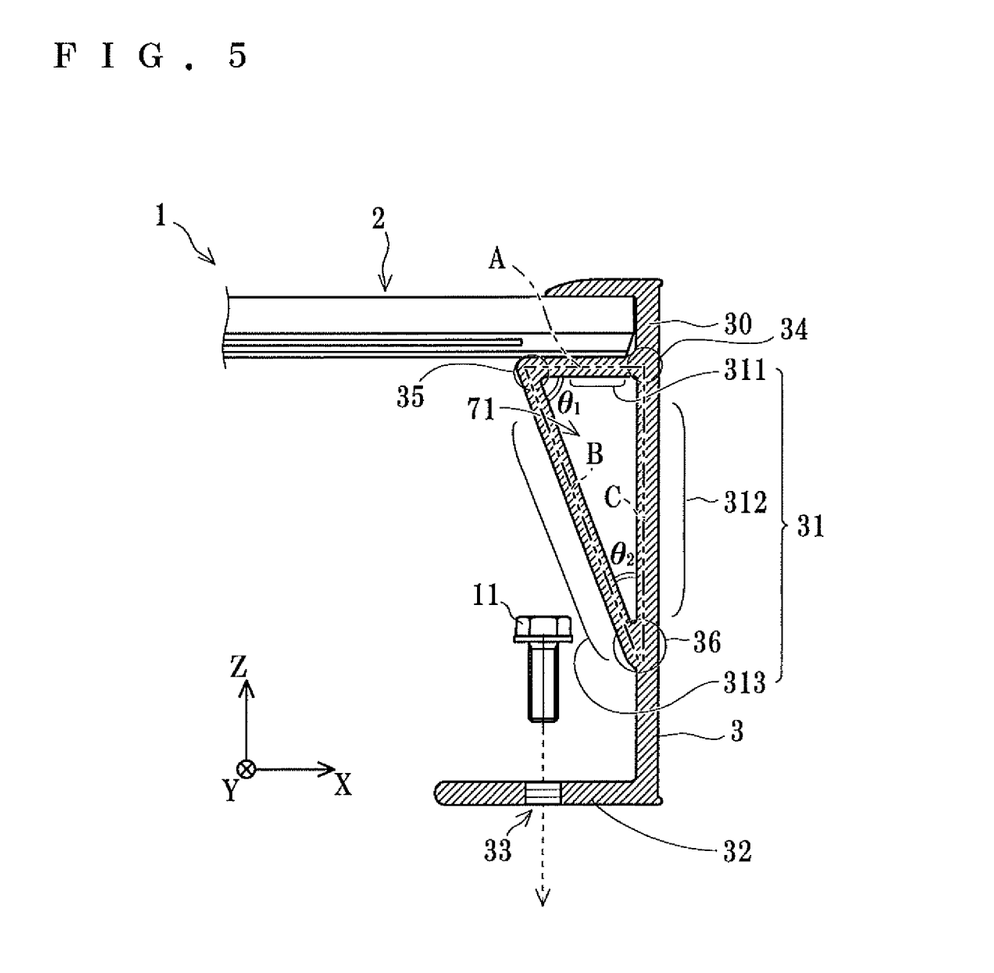
FIG. 5 is a cross-sectional view showing a cross section perpendicular to a longitudinal direction of a first frame.

As shown in FIG. 5, the corners (connecting parts 34, 35 and 36) of the annular part 31 in cross section are positioned at vertices of a triangle (right triangle in the present embodiment). An angle $\theta_1$ of an angle (interior angle) formed by the first part 311 and the third part 313 is an acute angle. In addition, an angle $\theta_2$ of an angle (interior angle) formed by the second part 312 and the third part 313 is an acute angle. Note that the angle $\theta_1$ can be considered to be the angle formed by a virtual line A linking the connecting part 34 and the connecting part 35 and a virtual line B linking the connecting part 35 and the connecting part 36. In addition, the angle $\theta_2$ can be considered to be the angle formed by the virtual line B and a virtual line C linking the connecting part 34 and the connecting part 36. While the angle formed by the first part 311 and the third part 313 is an acute angle in the present embodiment, the annular part 32 may be formed such that the angle formed by the first part 311 and the second part 312, that is, the angle formed by the virtual line A and the virtual line C is an acute angle.

The second part 312 is connected to the first part 311 in a substantially perpendicular manner at the connecting part 34 (portion on one side of the first part 311). The first part 311 abuts against the back surface of the solar cell panel 2 when the solar cell panel 2 is fitted into the fitting part 30. The first part 311 is a constituent part of the annular part 31 as well as a constituent part of the fitting part 30.

The third part 313 is connected to the first part 311 at the connecting part 35 (portion on the other side of the first part 311) and is connected to the second part 312 at the connecting part 36 (portion on the side of the second part 312 that is opposite to the second part 312) in a state of being slightly tilted relative thereto.

The bottom 32 is a plate-like portion in which a plurality of bolt holes 33 into which the bolt 11 can be inserted are provided along the longitudinal direction of the first frame 3. The first frame 3 is fastened to the platform 10 with the bolt 11 through the bolt hole 33.

In the first frame 3, the angle formed by the second part 312 and the third part 313 is an acute angle, and thus large space can be secured above the bottom 32. Therefore, it is possible to use the bolt 11 having a relatively large size. Further, the workability is improved, which reduces time for construction as well as error in construction.

Next, description is given of the force acting on the first frame 3 fastened to the platform 10 when a load is applied to the solar cell module 1. Note that the load in a positive pressure direction below refers to the force acting in the direction (−Z direction) in which the solar cell module is pressed from the light receiving surface side to the back surface side, and that the load in a negative pressure direction refers to the force acting in the direction (+Z direction) in which the solar cell module is pressed from the back surface side to the light receiving surface side.

Figure 6A:
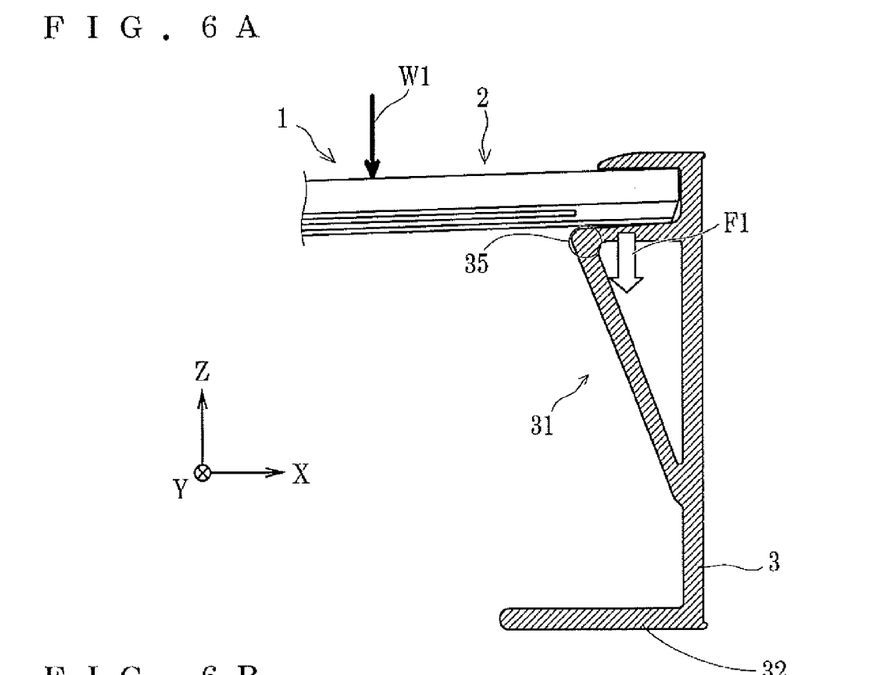
FIG. 6A shows a state in which a load is applied in a positive pressure direction.
Figure 6B:
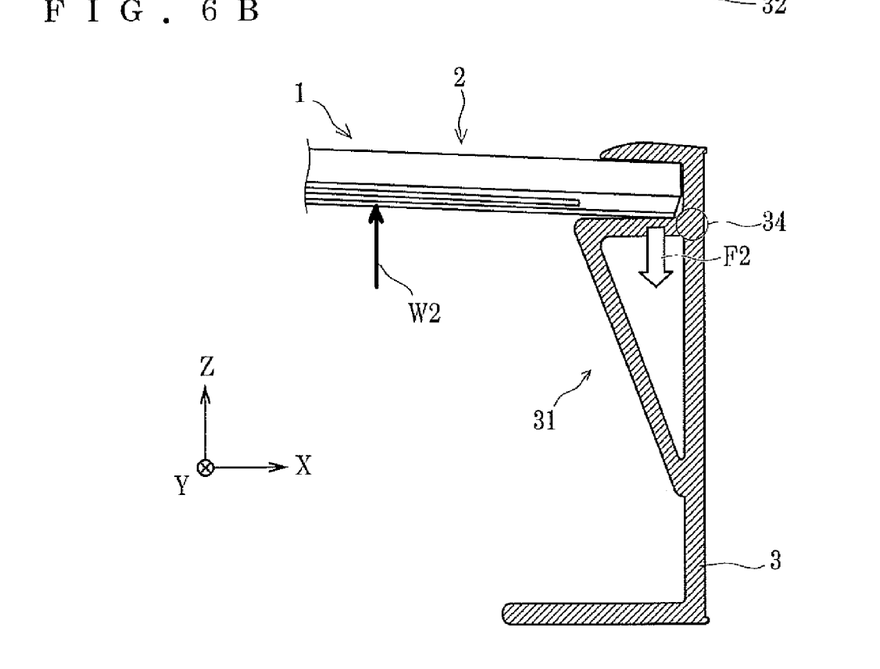
FIG. 6B shows a state in which a load is applied in a negative pressure direction.

When a load W1 in the positive pressure direction is applied to the solar cell module 1 as shown in FIG. 6A, the solar cell panel 2 is curved downward in a convex manner, and a force F1 in the (−Z) direction acts on the connecting part 35 side of the annular part 32. When a load W2 in the negative pressure direction is applied to the solar cell module 1 as shown in FIG. 6B, the solar cell panel 2 is curved upward in a convex manner, and a force F2 in the (−Z) direction acts on the connecting part 34 side of the annular part 31. That is, when a load is applied to the solar cell panel 2 in the positive direction or the negative direction, the force in the (−Z) direction acts on the first part 311.

Figure 7:
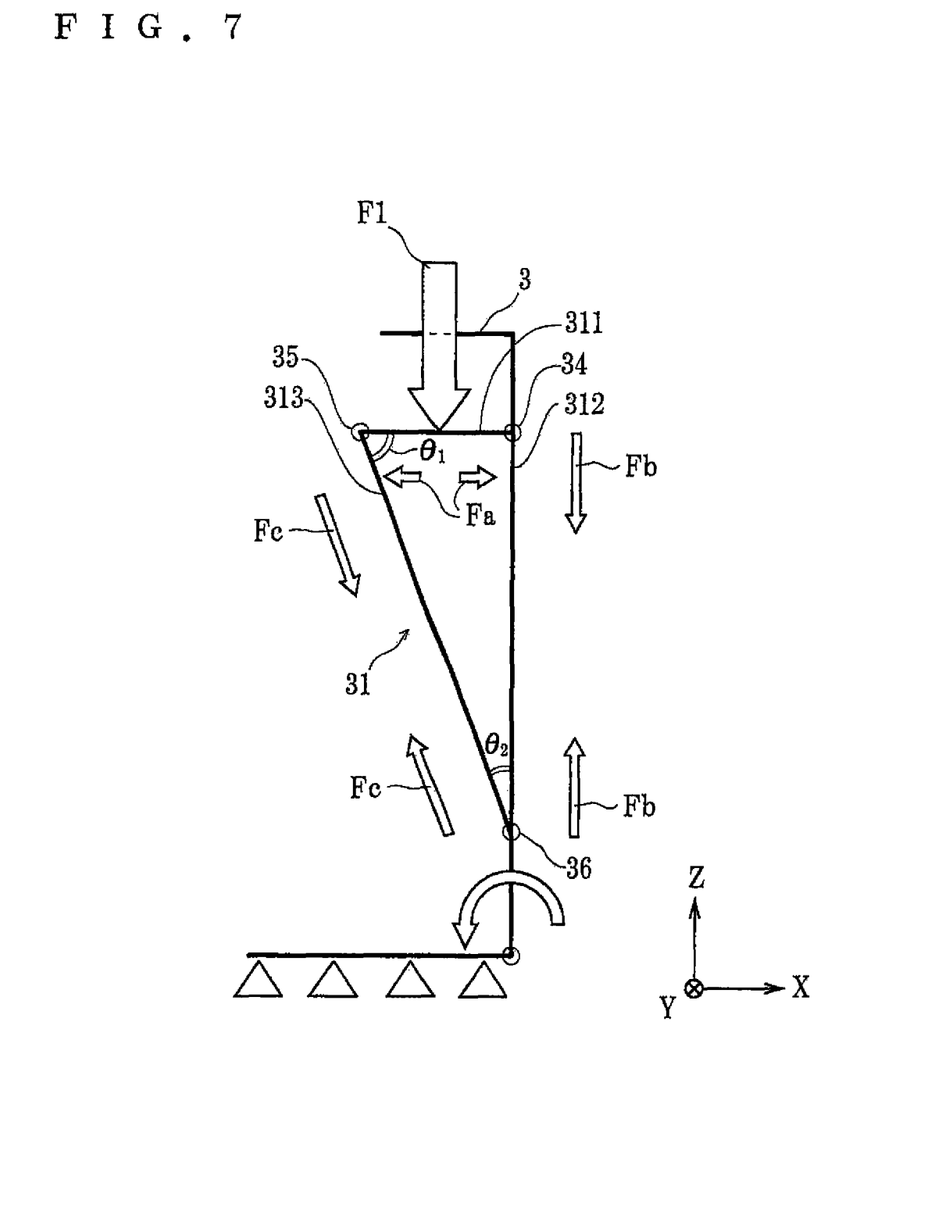
FIG. 7 is a schematic view showing the first frame.

If the force F1 acts on the annular part 31, a compressive force Fb acts on the second part 312 and a compressive force Fc acts on the third part 313, as shown in FIG. 7. In addition, a tensile force Fa acts on the first part 311.

Here, the compressive forces Fb and Fc act along the second part 312 and the third part 313, which does not cause deformations. Moreover, a shearing force and a bending moment hardly act on those parts. That is, the annular part 31 has a truss structure that has a high resistance to an external force, and thus the first part 311 is more resistant to deformation compared with the support part that includes an annular part having a square or rectangular cross-sectional shape. Accordingly, for example, it is possible to effectively suppress the solar cell panel 2 from becoming detached with the first frame 3.

As described above, by providing the third part 313 extending tilted toward the second part 312 based on the direction in which the second part 312 extends, it is possible to improve the strength of the first frame 3.

Second Embodiment

A solar cell module 1b according to a second embodiment of the present invention is described with reference to FIG. 8. Note that the elements having similar functions as those of the first embodiment are denoted by the same numerical references, and description thereof is omitted. The same holds true for the respective embodiments below.

An annular part 31b of a first frame 3b used in the solar cell module 1b is composed of a third part 313b having a curved shape including a plurality of bending parts in cross section (curved shape having two bending parts in FIG. 8) in place of the third part 313 of the first frame 3 and a fourth part 316 that is connected to the third part 313b in a link part 37b and is connected to the second part 312b in a substantially perpendicular manner. The annular part 31b has a space 71b therein.

Here, a virtual line D linking the connecting portions (connecting parts 35 and 37b) with the other parts of the third part 313b is tilted relative to a virtual line E linking the connecting portions (connecting parts 34 and 36b) with the other parts of the second part 312b. In this manner, the third part 313b of the annular part 31b has an acute angle formed by the virtual line D and the virtual line E and is provided in a state of being tilted relative to the second part 312b similarly to the third part 313 according to the first embodiment. Further, an angle formed by the virtual line A and the virtual line D is an acute angle.

Third Embodiment

Figure 8:
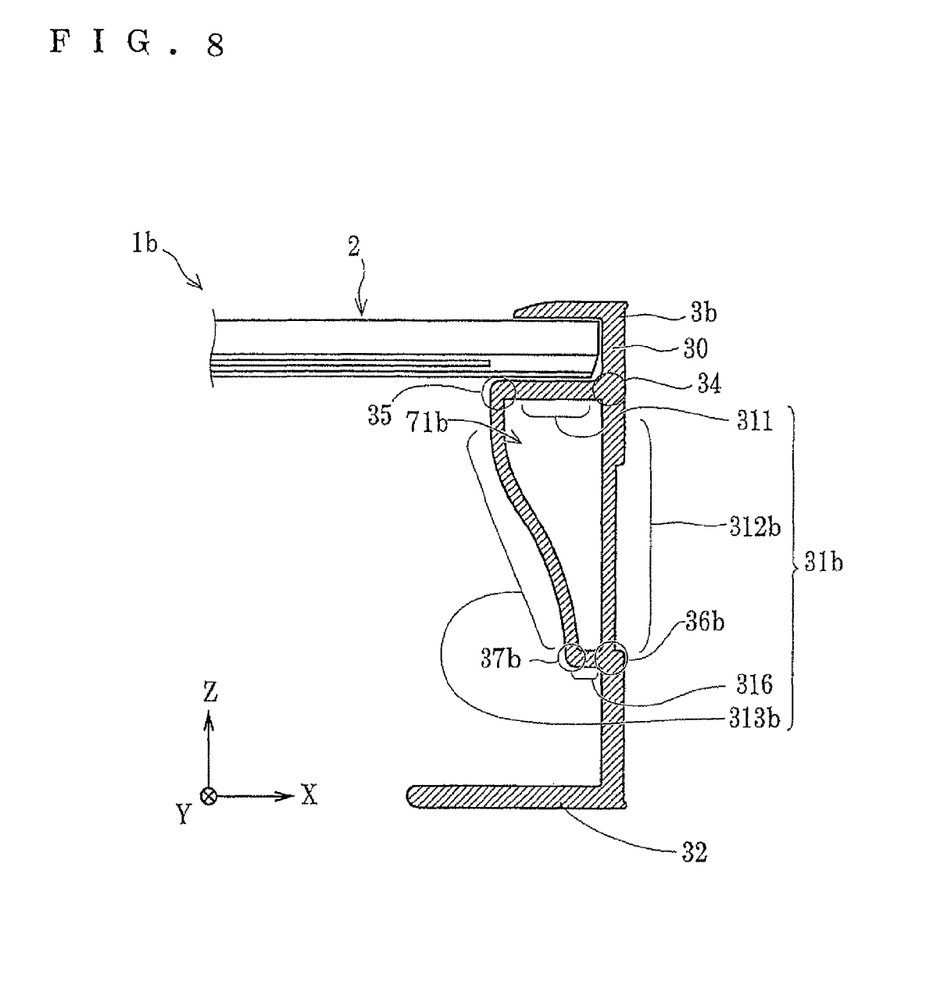
FIG. 8 is a cross-sectional view showing part of a solar cell module according to a second embodiment.

As shown in FIG. 8, the length of the fourth part 316 is smaller than the length of the first part 311 in cross section, and thus the annular part 31b has a substantially trapezoidal shape, and the respective connecting parts 34, 35, 36b and 37b are positioned at vertices of the substantially trapezoidal shape. The length of the fourth part 316 is made to be smaller than the length of the first part 311 in this manner, and accordingly the bending moment acting on the fourth part 316 when a force is applied to the annular part 31b can be reduced, and thus the rigidity of the annular part 31b can be improved.

Further, in the first frame 3 according to the first embodiment, the third part 313 is connected to the second part 312 tilted relative thereto, and thus the thickness in the vicinity of the connecting part 36 increases locally. On the other hand, in the present embodiment, the fourth part 316 is connected to the second part 312b in a substantially perpendicular manner, and thus it is possible to suppress the thickness from increasing locally at an intersecting portion (connecting part 36b) thereof. This facilitates an operation such as cutting part of the annular part 31b with a processing tool such as a blade of a punch being put to the fourth part 316 in the present embodiment. Note that as shown in FIG. 8, the thickness of the second part 312b may be made smaller in part compared with the second part. This enables a reduction in material cost while securing the strength.

Figure 9:
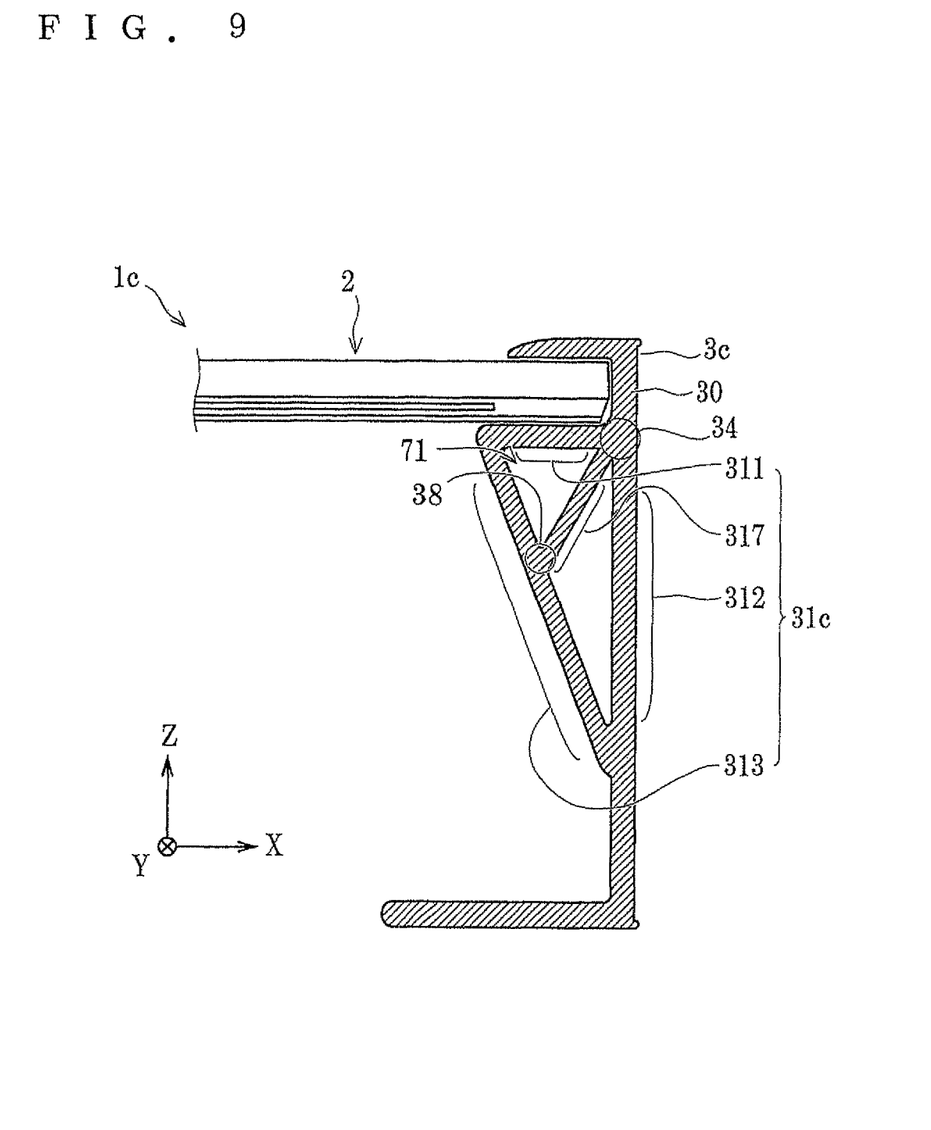
FIG. 9 is a cross-sectional view showing part of a solar cell module according to a third embodiment.

Next, a solar cell module 1c according to a third embodiment of the present invention is described with reference to FIG. 9.

An annular part 31c of a first frame 3c includes, in the space 71 of the annular part 31 of the first frame 3, a connecting member 317 having one end connected to the connecting part 34 and the other end connected to a connecting part 38 above the third part 313. The connecting member 317 may be provided over an entire first frame 3c in the longitudinal direction (Y-axis direction) or may be provided so as to be dispersed and partially positioned. The provision of the connecting member 317 makes it difficult for the third part 323 to buckle, and hence the strength of the first frame 3c can be improved.

Fourth Embodiment

Figure 10:
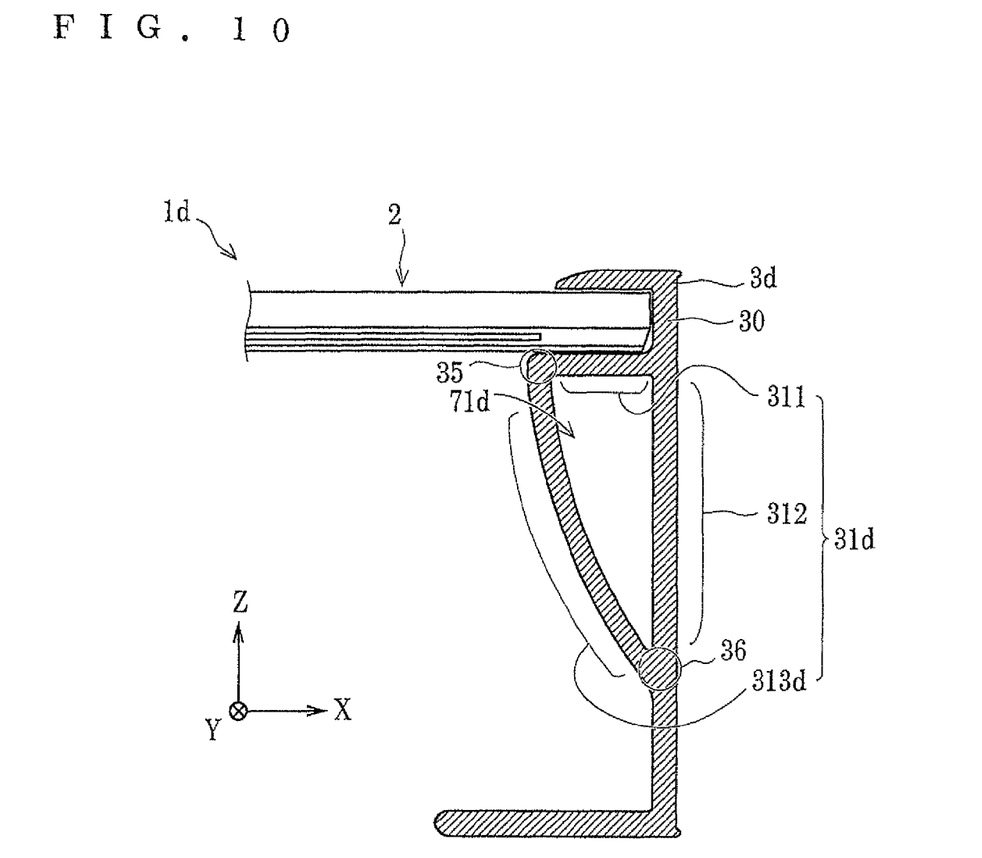
FIG. 10 is a cross-sectional view showing part of a solar cell module according to a fourth embodiment.

Next, a solar cell module 1d according to a fourth embodiment of the present invention is described with reference to FIG. 10.

In an annular part 31d of a first frame as 3d according to the present embodiment, a third part 313d having an arch-shaped cross section orthogonal to the longitudinal direction of the annular part 31d is provided in place of the third part 313 of the first frame 3. More specifically, the third part 313d forms a curved shape so as to be curved in a direction farther from the second part 312 between the connecting portion (connecting part 35) with the first part 311 and the connecting portion (connecting part 36) with the second part 312. Further, the annular part 31d has a space 71d therein.

A virtual line F linking the connecting portions (connecting parts 35 and 36) with the other parts of the third part 313d is tilted relative to a virtual line G linking the connecting portions (connecting parts 34 and 36) with the other parts of the second part 312. That is, in the annular part 31d, the third part 313d is provided so as to be tilted relative to the second part 312 similarly to the third part 313 according to the first embodiment. The angle formed by the virtual line A and the virtual line F is an acute angle.

By making the third part 313d have an arch shape, the annular part 31d is resistant to deformation even in a case where a pressure is applied from an inside or an outside thereof. For example, the annular part 31d is resistant to deformation even in a case where the water that has entered the annular part 31d freezes to expand, and thus the strength of the first frame 3d can be enhanced.

Next, a solar cell module 1d according to a fifth embodiment of the present invention is described.

In an annular part of a first frame according to the present embodiment, a third part detachable with respect to the first frame is provided in place of the third part 313 of the first frame 3. Note that, a projection projecting downward is formed at the portion on the other side of the first part 311, and a hook part is formed on a lower side of the second part 312. The third part is linked to the first part 311 in the projection and is linked to the second part 312 in the hook part. The annular part has a space formed by the first part 311, the second part 312 and the third part therein.

The third part may have a flat plate shape extending in the longitudinal direction of the first frame 3 or an elongated bar shape. The third part is sandwiched between the projection and the hook part when being mounted, and thus is sandwiched between and fastened by the first part 311 and the second part 312 when a load is applied to the annular part.

In a case of the present embodiment, the third part may be an optional accessory that is added as needed, and thus the first frame can be provided with a minimum required strength. Therefore, the first frame having the strength corresponding to the surroundings can be provided. Further, by composing the member for the third part of a member having a higher strength compared with other part, it is possible also to improve the strength of the first frame.

Modification

The present invention is not limited to the above-mentioned embodiments, and numerous modifications and variations can be devised without departing from the scope of the invention.

For example, in one solar cell module 1, frames may be configured by appropriately selecting from the above-mentioned first frames 3 and 3b to 3d, and the second frame 4.

Further, the entire third part is not required to be tilted relative to the second part, and at least part thereof may be provided in a state of being tilted relative to the second part. For example, the third part 313 of the first frame 3 may be composed of a portion parallel to the second part 312 and a portion tilted relative to the second part 312.

The invention claimed is:

1. A solar cell module, which comprises a solar cell panel and a frame mounted to an edge of said solar cell panel, wherein:
   said frame includes an elongated support part provided along the edge of said solar cell panel and supporting said solar cell panel from a back surface side;
   said support part includes an annular part having an annular shape in cross section perpendicular to a longitudinal direction thereof;
   said annular part includes a first part abutting against said solar cell panel in said cross section, and a pair of corners provided at both ends of said first part, wherein at least one of said pair of corners has an acute angle,
   said annular part further including a second part connected to one end of said first part, and a third part connected to the other end of said first part;
   said second part being provided so as to be orthogonal to said first part;
   said third part being tilted relative to said second part so as to be close to said second part;
   said annular part further including a fourth part connected to said second part and said third part,
   wherein a length of said fourth part in a direction orthogonal to said longitudinal direction is smaller than a length of said first part in a direction orthogonal to said longitudinal direction.

2. The solar cell module according to claim 1, wherein said third part has a curved shape.

3. The solar cell module according to claim 1, wherein:
   said frame includes a first frame and a second frame connected to said first frame;
   said first frame and said second frame are connected by a fastening mechanism and a fitting mechanism;
   said fastening mechanism includes:
      a fixture;
      an insertion hole formed in one of said first and second frames, into which said fixture is inserted; and
      a fixing hole formed in the other of said first and second frames, into which said fixture is inserted; and
   said fitting mechanism includes:
      a groove formed in one of said first and second frames; and
      a protrusion formed in the other of said first and second frames.

4. The solar cell module according to claim 1, wherein said annular part has a trapezoidal shape in said cross section.

\* \* \* \* \*